June 10, 1930.  J. E. POINTON ET AL  1,763,322
DOUGH DIVIDING MACHINE
Filed Dec. 5, 1928    3 Sheets-Sheet 2
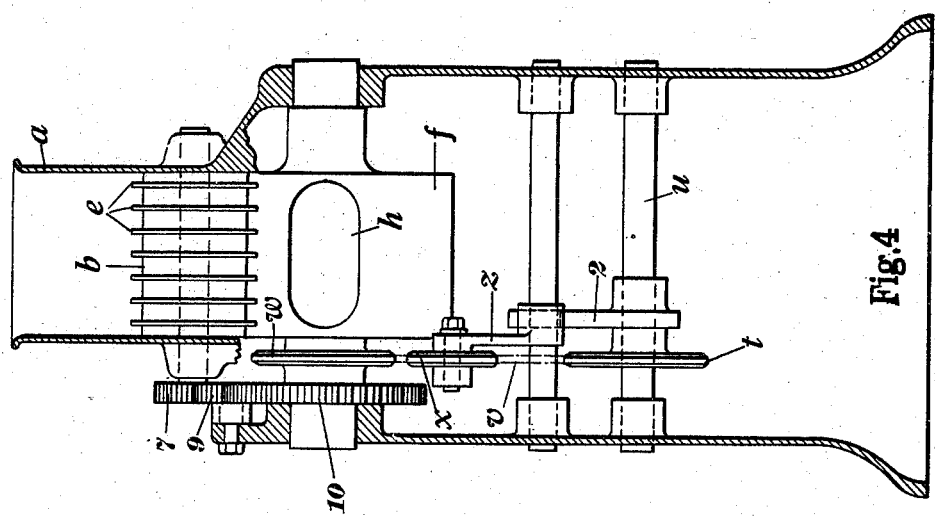
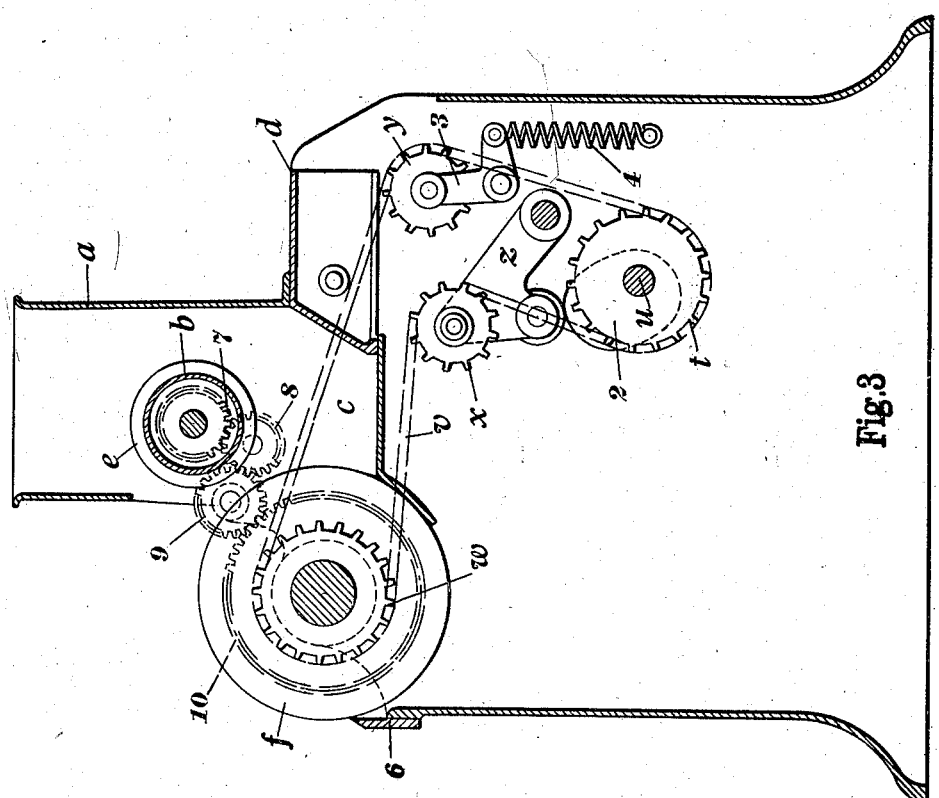
INVENTORS
LAURENCE SEYMOUR HARBER
JOHN EDWARD POINTON
BY
ATTORNEY June 10, 1930.  J. E. POINTON ET AL  1,763,322
DOUGH DIVIDING MACHINE
Filed Dec. 5, 1928  3 Sheets-Sheet 3

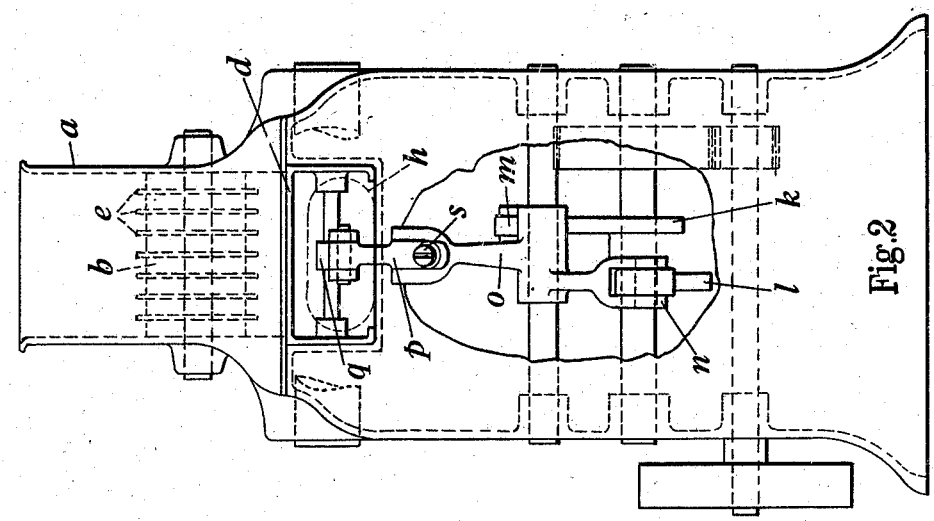
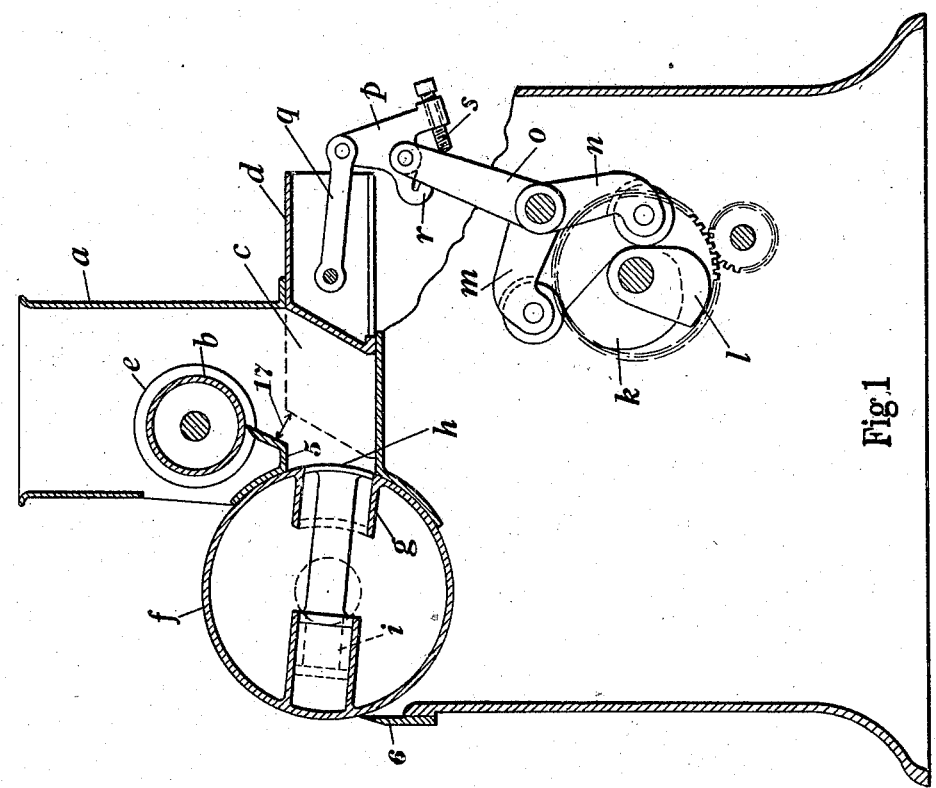

INVENTORS
LAURENCE SEYMOUR HARBER
JOHN EDWARD POINTON
BY
ATTORNEY

Patented June 10, 1930

1,763,322

UNITED STATES PATENT OFFICE

JOHN EDWARD POINTON AND LAURENCE SEYMOUR HARBER, OF PETERBOROUGH, ENGLAND, ASSIGNORS TO BAKER PERKINS COMPANY INCORPORATED, OF NEW YORK, N. Y.

DOUGH-DIVIDING MACHINE

Application filed December 5, 1928, Serial No. 323,967, and in Great Britain August 24, 1928.

This invention relates to dough-dividing machines for bread making and like purposes, of the type comprising a hopper into which the dough is fed, a box which receives dough from the hopper under the action of a roller, a measuring chamber in communication with the box, and a ram whereby dough is pressed from the box into the measuring chamber. Machines of this kind, which are well known, give satisfactory service under the condition which they are intended to meet. The need has, however, arisen under modern bakery conditions for an increased output per machine, and a greater uniformity as regards the weight of the divided dough portions. The object of the present invention is to provide an improved machine whereby these new conditions can be successfully met.

An important, if not the main, factor which occasions difficulty in the sub-dividing of a mass of dough into portions of equal weight, is the occluded gas. So far as the texture of the finished loaf is concerned this gas is desirable. The gas is distributed more or less unevenly throughout the dough in cells of varying size. To enable accurate sub-division to be effected, it is necessary to reduce the size of these cells as much as possible, and also obtain as uniform distribution as possible, and this must be done without "felling" or "killing" the dough.

The present invention comprises the employment of means whereby the measuring chamber is filled by displacing a greater quantity of dough than that required to fill the chamber, the excess being returned to the main bulk of dough and without severance therefrom.

In particular the invention comprises the employment of a hopper and top box which are in constant communication, and a ram which displaces at each operation a volume of dough greater than that required to fill the measuring chamber, the excess being caused to return to or in the direction of the hopper, only the dough in the measuring chamber being separated from the dough mass.

By our invention the dough is subjected to an action whereby the gas cells become greatly attenuated and more evenly distributed, and undesirable expulsion of gas is avoided. Consequently accurate sub-division can be attained without impairing the texture of the finished loaf.

The invention also comprises a machine as hereinafter described.

In the three accompanying sheets of explanatory drawings:—

Figure 1 is a part sectional side elevation and Figure 2 is an end elevation showing diagrammatically a machine constructed in accordance with this invention.

Figure 3 is a sectional side elevation and Figure 4 a sectional end elevation showing diagrammatically means for driving the measuring chamber and the feed roller.

Figure 5:
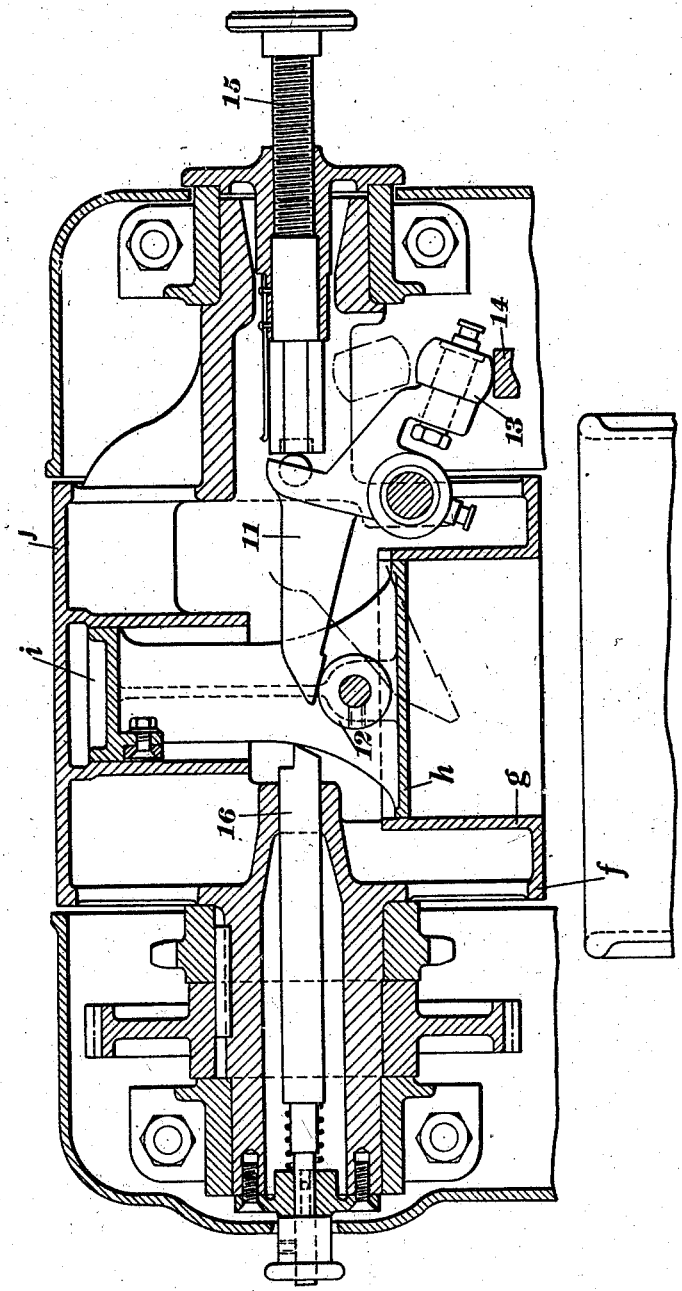
Figure 5 is a plan of a mechanism for effecting reciprocation of the piston in the rotary measuring chamber.

In carrying the invention into effect as shown, a hopper $a$ for receiving a mass of dough is provided with a feeding roller $b$ and is situated over a box $c$ in one end of which is arranged a reciprocating ram $d$. The feeding roller may be provided with circumferential knives $e$ which cut the dough and facilitate the feeding action. At the opposite end of the box is arranged a rotary cylindrical member $f$ in the periphery of which is formed the measuring chamber $g$. The said chamber contains a piston $h$ which during the rotation of the chamber is reciprocated to receive and discharge the dough. Convenient means for reciprocating the piston are described below. Preferably the piston is connected to a dash pot $i$ to counteract the sudden action of the ram.

In each cycle of operations, dough is fed forward to the top box from the hopper $a$ by the roller $b$. When the ram $d$ advances the measuring chamber $g$ is in position to receive a quantity of dough. The amount of dough displaced by the ram is in excess of that required to fill the measuring chamber, and the extent of movement of the ram is such as not to sever the dough from that moving towards the box from the hopper.

For example, the ram may be advanced to the position shown by dotted lines, but this position may be varied. During the movement of the ram a quantity of dough equal to the difference between that taken by the measuring chamber and that displaced by the ram is returned in the direction of the hopper. The dough occupying the position between the feed roller and the ram is therefore subjected to an alternate forward and backward action which has the effect of attentuating and evenly distributing the gas cells and enabling accurate sub-division of the dough into pieces of uniform weight to be effected at a higher rate of speed than has hitherto been possible. Further by leaving a gap at 17 the usual suction action which is exerted by the ram on the dough in the measuring chamber, during the return of the ram, and which makes accurate and rapid measuring very difficult, is minimized. After completing its forward movement, the ram is returned in readiness for the next cycle of operations. It is advantageous to effect the forward movement of the ram quickly, and the return movement at a relatively slower rate. The dough in the measuring chamber is severed from the original mass by the rotation of the cylindrical member carrying the measuring chamber.

The reciprocation of the ram may be conveniently effected by the action of a pair of cams $k$, $l$, on the bifurcated ends $m$, $n$, of a lever $o$ the opposite end of which is connected to the ram through a floating lever $p$ and a connecting rod $q$. The cams $k$, $l$, are shaped to impart a rapid forward movement and a slow return movement of the ram. The floating lever $p$ is provided with a pair of abutments $r$, $s$, which are respectively fixed and adjustable and are adapted to act on opposite sides of the lever. When the adjustable abutment $s$ (which may conveniently be formed by a screw) locks the floating lever on the cam actuated lever $o$, the maximum stroke is given to the ram. A smaller stroke can be given to the ram by altering the position of the adjacent abutment $s$ so as to allow a suitable lost motion to occur between the floating lever $p$ and the cam operated lever $o$.

Whilst it is preferable to be able to adjust the stroke of the ram and thereby to vary the aperture 17 formed by the forward end of the ram and the adjacent part of the top box, to suit doughs of different consistencies, the ram may be operated with a stroke (and consequently an aperture 17) of fixed amount, but in all cases there is at all times free communication between the hopper and the top box to allow of the aforesaid reverse movement of the excess dough.

Any convenient mechanism may be employed for rotating the cylindrical member $f$ containing the measuring chamber. Preferably the said member receives a continuous rotary motion, but in each rotation the rate of rotation is suitably varied. A suitable means for producing this motion is shown in Figures 3 and 4. A sprocket wheel $t$ on the main shaft $u$ is connected by a chain $v$ with a sprocket wheel $w$ on the rotary member $f$. The chain passes over a pair of intermediate sprocket wheels $x$, $y$. The sprocket wheel $x$ is carried on a lever $z$ which can be actuated by a cam 2, whilst the wheel $y$ is carried on a lever 3 controlled by a spring 4 or weight. The sprocket $t$ rotates at a constant speed. By the action of the cam 2 on the lever $z$, the length of chain lying between the wheels $t$, $w$ and passing over the wheel $x$ is caused to vary, and this action results in variation of the speed of the member $f$ at suitable intervals in each rotation. The variations in the chain are accommodated automatically by the wheel $y$ and spring 4. This mechanism by which a variable motion of the part $f$ is obtained forms no part of the present invention, and is the subject of a concurrent patent application.

While the dough is being pressed into the measuring chamber, the cylindrical member $f$ rotates slowly. After the filling of the chamber $g$, the member $f$ is carried past a sharp edge 5 in the top box to sever the contained dough from the original mass. Subsequently the cylindrical member is rotated at a relatively rapid rate. During this movement the divided dough portion is ejected, and finally the measuring chamber is returned to the position at which it can receive the next charge. At the delivery position a sharp edge or scraper 6 may be employed to prevent adhesion of dough to the piston of the measuring chamber. If desired the cylindrical member may be provided with a plurality of measuring chambers. It is advantageous, however, in all cases to employ a relatively broad and shallow chamber, to facilitate complete and rapid filling of the chamber.

Rotation of the roller $b$ may be conveniently effected by connecting it to the member $f$ through gear wheels 7, 8, 9, 10. The roller $b$ is then driven with a variable motion.

For reciprocating the piston $h$ within the measuring chamber $g$, we may employ a mechanism as shown in Figure 5. A lever 11 carried on the rotary member $f$ is adapted at one end to abut against a roller 12 on the part $h$, and at the other end is provided with a roller 13 which co-operates with a stationary cam 14 of suitable shape. By the rotation of the part $f$ the roller 13 travels around the cam 14 and is caused to impart the required movement of the piston

*h* for ejecting the dough portion. The inner position of the piston *h* may be adjusted by a screwed stem 15 situated on the axis of rotation of the part *f*. The outer limit of motion of the piston *h* is fixed by an axial stop 16 which can be withdrawn to permit removal of the piston.

The invention is not limited to the example above described, as the mechanical details may be varied to meet different requirements.

Having thus described our invention what we claim as new and desire to secure by Letters Patent is:—

1. In a dough measuring machine the combination of a dough hopper, a variable speed feeding roller therein, a rotary cylindric member seated in a part-cylindric-shaped apertured seat formed in a side wall of the hopper, said member mounted for continuous rotation at variable speeds, and formed with a measuring chamber having a reciprocatory piston therein, power means actuating said cylindric member and piston, a cutting member located at the upper edge of the aperture in said cylindric seat and projecting inwardly and upwardly to the feeding roller, a ram having its working face inclined upwardly and rearwardly, power means actuating the ram toward and from the measuring chamber, an adjustable stop means terminating the forward movement of the ram at selective predetermined distances from said cutting member, so as to present at all times a return passageway for dough upwardly into the hopper from the spaces between the working face of the ram and the rotary cylindric member.

2. In a dough-measuring machine the combination of a dough hopper, a rotary cylindric member seated in a part-cylindric-shaped apertured seat formed in a side wall of the hopper, said member mounted for rotation at variable speeds, and formed with a measuring chamber having a reciprocatory piston therein, power means actuating said cylindric member and piston, a cutting member located at the upper edge of the aperture in said cylindric seat and projecting inwardly and upwardly, a ram, power means actuating the ram toward and from the measuring chamber, comprising a pair of cams, a lever co-operating with both cams, a floating lever pivoted on the cam-actuated lever and a connecting rod attached to both the floating lever and the ram.

3. A dough dividing machine as claimed in claim 2, wherein the floating lever carries a pair of relatively adjustable abutments for engagement with the cam-actuated lever.

4. In a dough-measuring machine, the combination of a dough hopper, a variable speed feeding roller therein, a rotary cylindric member seated in a part cylindric-shaped apertured seat formed in a side wall of the hopper, said member mounted for continuous rotation at variable speeds, and formed with a measuring chamber having a reciprocatory piston therein, power means actuating said cylindric member, and piston actuating means including a stationary cam, a lever pivoted on the cylindric member and having an end operatively engaging said cam, a roller on the piston engaged by the other end of said lever, an adjustable threaded stop mounted in the axis of rotation of the cylindric member for engagement with said lever to limit the retractive movement of the piston, and a spring-pressed axial stop normally engaging the piston to limit its ejection movement, a cutting member located at the upper edge of the aperture in said cylindric seat and projecting inwardly and upwardly to the feeding roller, a ram, power means actuating the ram toward and from the measuring chamber, an adjustable stop means terminating the forward movement of the ram at selective predetermined distances from said cutting member.

In testimony whereof we have signed our names to this specification.

JOHN EDWARD POINTON.
LAURENCE SEYMOUR HARBER.